(12) United States Patent
Yokoi et al.

(10) Patent No.: US 12,366,814 B2
(45) Date of Patent: Jul. 22, 2025

(54) SCANNING OPTICAL DEVICE INCLUDING FIRST SEMICONDUCTOR LASER, SECOND SEMICONDUCTOR LASER, FIRST OPTICAL SENSOR, AND SECOND OPTICAL SENSOR WHICH ARE MOUNTED ON CIRCUIT BOARD

(71) Applicant: BROTHER KOGYO KABUSHIKI KAISHA, Nagoya (JP)

(72) Inventors: Junichi Yokoi, Nagoya (JP); Koji Abe, Okazaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/494,428

(22) Filed: Oct. 25, 2023

(65) Prior Publication Data

US 2024/0168402 A1 May 23, 2024

(30) Foreign Application Priority Data

Nov. 18, 2022 (JP) ................................ 2022-184675

(51) Int. Cl.
*G03G 15/04* (2006.01)
*G02B 26/12* (2006.01)
*G03G 15/043* (2006.01)

(52) U.S. Cl.
CPC ....... *G03G 15/04036* (2013.01); *G02B 26/12* (2013.01); *G03G 15/043* (2013.01)

(58) Field of Classification Search
USPC ........................................................ 399/216
See application file for complete search history.

(56) References Cited

U.S. PATENT DOCUMENTS

| 2008/0055687 | A1* | 3/2008 | Mukai | G02B 26/127 |
| | | | | 359/197.1 |
| 2009/0153644 | A1* | 6/2009 | Naito | G02B 26/124 |
| | | | | 347/243 |
| 2009/0316244 | A1* | 12/2009 | Hwang | G02B 26/123 |
| | | | | 359/206.1 |
| 2016/0347083 | A1* | 12/2016 | Ishidate | B41J 2/471 |

FOREIGN PATENT DOCUMENTS

| JP | 2003-222812 A | 8/2003 |
| JP | 2009-145569 A | 7/2009 |
| JP | 2018-066878 A | 4/2018 |

* cited by examiner

*Primary Examiner* — Quana Grainger
(74) *Attorney, Agent, or Firm* — Baker Botts L.L.P.

(57) ABSTRACT

A scanning optical device includes: a first semiconductor laser; a second semiconductor laser; a first coupling lens configured to convert light from the first semiconductor laser into a first light beam; a second coupling lens configured to convert light from the second semiconductor laser into a second light beam; a deflector configured to deflect the first light beam and the second light beam; a first optical sensor configured to detect the deflected first light beam; a second optical sensor configured to detect the deflected second light beam; a first scanning optical system configured to form an image using the deflected first light beam; a second scanning optical system configured to form an image using the deflected second light beam; and a circuit board. The first semiconductor laser, the second semiconductor laser, the first optical sensor, and the second optical sensor are mounted on the circuit board.

16 Claims, 8 Drawing Sheets

SCANNING OPTICAL DEVICE INCLUDING FIRST SEMICONDUCTOR LASER, SECOND SEMICONDUCTOR LASER, FIRST OPTICAL SENSOR, AND SECOND OPTICAL SENSOR WHICH ARE MOUNTED ON CIRCUIT BOARD

REFERENCE TO RELATED APPLICATIONS

This application claims priority from Japanese Patent Application No. 2022-184675 filed on Nov. 18, 2022. The entire content of the priority application is incorporated herein by reference.

BACKGROUND ART

There has been conventionally known a scanning optical device including a plurality of (specifically, two) optical sensors for detecting light scanned by a polygon mirror.

DESCRIPTION

However, the two optical sensors are provided on different circuit boards in the conventional scanning optical device, making assembly of the scanning optical device complicated.

In view of the foregoing, it is an object of the present disclosure to provide a scanning optical device in which an increase in the complexity of assembly of the same is restrained.

In order to attain the above and other objects, according to one aspect, the present disclosure provides a scanning optical device including: a first semiconductor laser; a second semiconductor laser; a first coupling lens; a second coupling lens; a deflector; a first optical sensor; a second optical sensor; a first scanning optical system; a second scanning optical system; and a circuit board. The first semiconductor laser is configured to emit first light. The second semiconductor laser is configured to emit second light. The first coupling lens is configured to convert the first light emitted from the first semiconductor laser into a first light beam. The second coupling lens is configured to convert the second light emitted from the second semiconductor laser into a second light beam. The deflector includes a polygon mirror configured to deflect the first light beam from the first coupling lens and the second light beam from the second coupling lens in a main scanning direction. The first optical sensor is configured to detect the first light beam deflected by the deflector. The second optical sensor is configured to detect the second light beam deflected by the deflector. The first scanning optical system is configured to form an image on a first image plane using the first light beam deflected by the deflector. The second scanning optical system is configured to form an image on a second image plane using the second light beam deflected by the deflector. The circuit board is configured to drive the first semiconductor laser and the second semiconductor laser. The first semiconductor laser, the second semiconductor laser, the first optical sensor, and the second optical sensor are mounted on the circuit board.

In the above structure, the first semiconductor laser, the second semiconductor laser, the first optical sensor, and the second optical sensor are all mounted on the circuit board, thereby making assembly of the scanning optical device easy.

Hereinafter, one embodiment of the present disclosure will be described while referring to the accompanying drawings.

Figure 1:
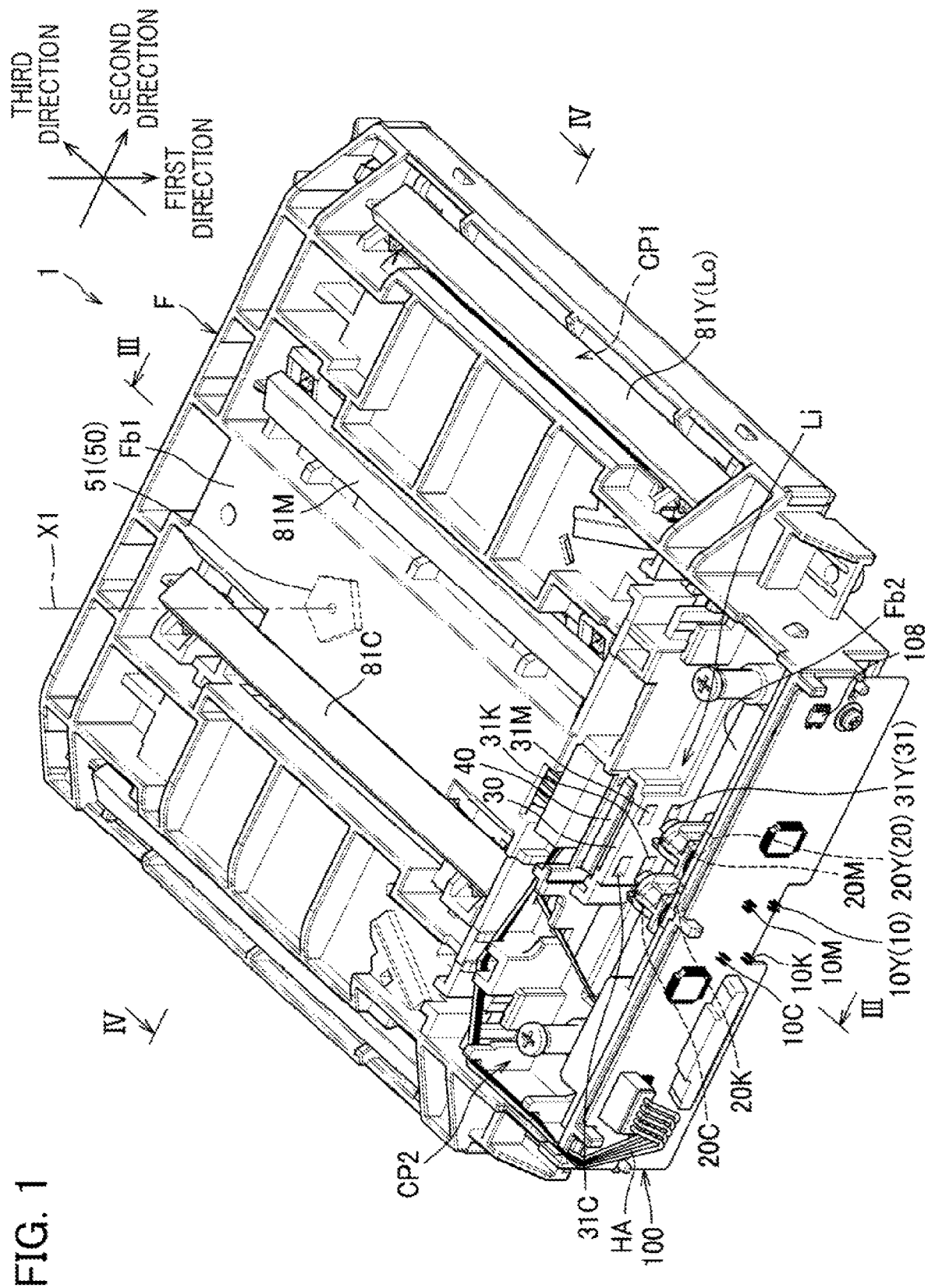
FIG. 1 is a perspective view of a scanning optical device as viewed from another side in a first direction.
Figure 2:
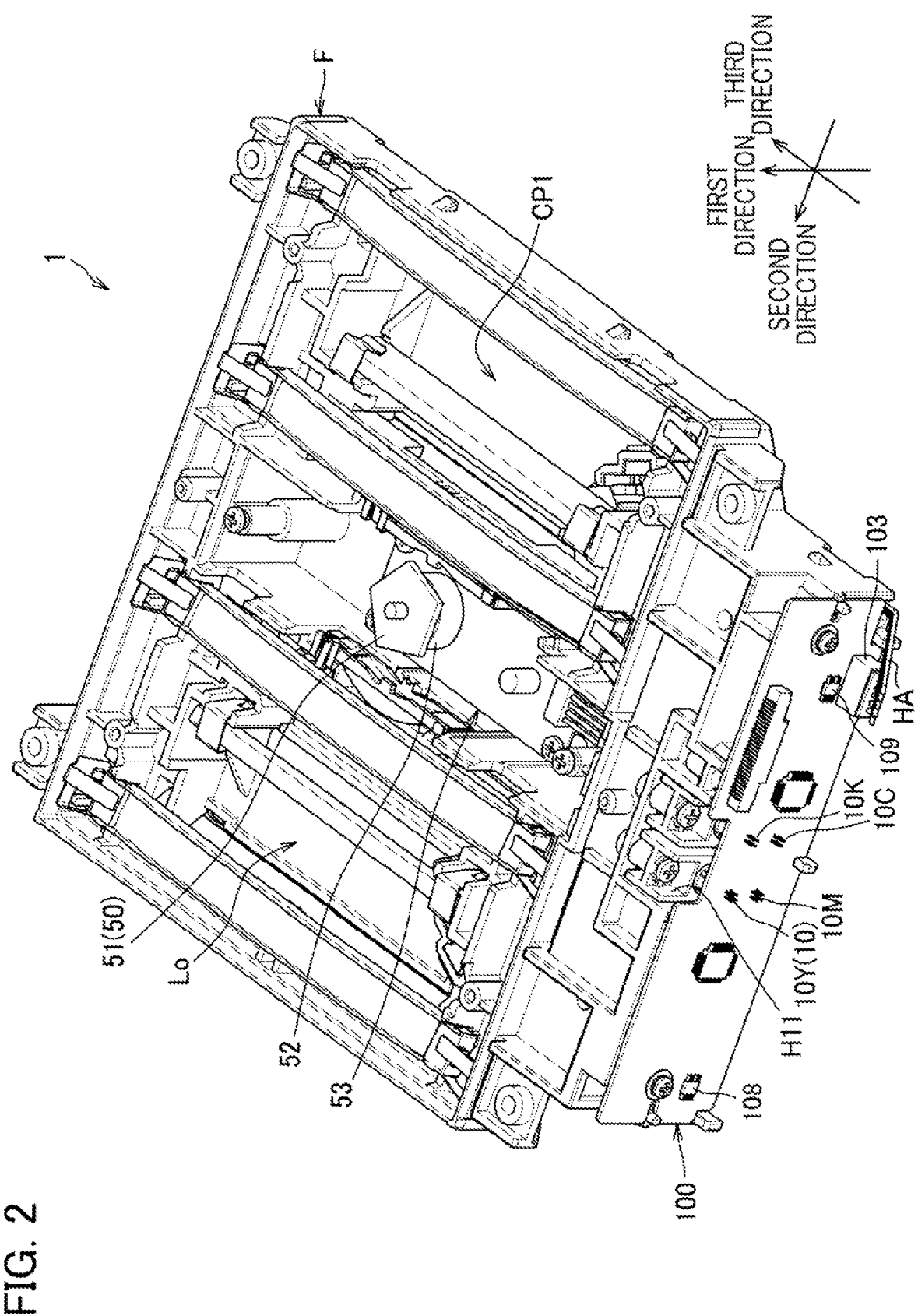
FIG. 2 is a perspective view of the scanning optical device as viewed from one side in the first direction.

As illustrated in FIGS. 1 and 2, a scanning optical device 1 includes a frame F, an incident optical system Li, a deflector 50, scanning optical systems Lo, a circuit board 100, a first optical sensor 108, and a second optical sensor 109. The scanning optical device 1 in the present embodiment is used in an electrophotographic type image-forming apparatus. The image-forming apparatus includes four photosensitive drums 200 (four photosensitive drums 200Y, 200M, 200C, and 200K; see FIG. 4).

In the following description, a direction parallel to a rotational axis X1 of a polygon mirror 51 (described later) will be referred to as "first direction". Further, a direction in which the polygon mirror 51 is aligned with first scanning lenses 60YM and 60CK (described later; see FIG. 4) and that is orthogonal to the first direction will be referred to as "second direction." Further, a direction orthogonal to both the first direction and the second direction will be referred to as "third direction." The third direction corresponds to a main scanning direction, and the first direction corresponds to a sub scanning direction of the incident optical system Li.

Note that arrows in the drawings for these directions each point to one side of the respective direction. That is, a leading side of the arrows corresponds to the one side of the respective directions, and a trailing side of the arrows corresponds to the other side of the respective directions.

The incident optical system Li includes semiconductor lasers 10, coupling lenses 20, an aperture plate 30, and a condenser lens 40. The semiconductor lasers 10 include first semiconductor lasers 10Y and 10M, and second semiconductor lasers 10C and 10K. The coupling lenses 20 include first coupling lenses 20Y and 20M, and second coupling lenses 20C and 20K.

The semiconductor lasers 10 are devices configured to emit light. Four of the semiconductor lasers 10 are provided to correspond to the four photosensitive drums 200 (see FIG. 4) which are scanned and exposed by the scanning optical device 1. Toner images in colors different from one another are formed on the respective photosensitive drums 200.

In the present embodiment, among four colors different from one another, a first color will be yellow (Y), a second color will be magenta (M), a third color will be cyan (C), and a fourth color will be black (K). In the following description, parts related to each color may be distinguished by adding the respective letter "Y", "M", "C", or "K" to the end of the reference numeral of the corresponding part.

The semiconductor lasers 10 include the two first semiconductor lasers 10Y and 10M respectively corresponding to yellow and magenta, and the two second semiconductor lasers 10C and 10K respectively corresponding to cyan and black. The two first semiconductor lasers 10Y and 10M are arranged to be spaced apart from each other in the first direction. The first semiconductor laser 10Y is positioned on the one side of the first semiconductor laser 10M in the first direction.

The second semiconductor laser 10C is aligned with and spaced apart from the first semiconductor laser 10M in the second direction. The second semiconductor laser 10C is positioned on the other side of the first semiconductor laser 10M in the second direction. The second semiconductor laser 10K is aligned with and spaced apart from the second semiconductor laser 10C in the first direction, and is aligned with and spaced apart from the first semiconductor laser 10Y in the second direction.

The first coupling lenses 20Y and 20M and the second coupling lenses 20C and 20K are disposed to face the corresponding semiconductor lasers 10Y, 10M, 10C, and 10K. The first coupling lenses 20Y and 20M are configured to convert light emitted from the first semiconductor lasers 10Y and 10M into first light beams BY and BM, respectively. The second coupling lenses 20C and 20K are configured to convert light emitted from the second semiconductor lasers 10C and 10K into second light beams BC and BK, respectively.

The aperture plate 30 has aperture diaphragms 31 through which the light beams exiting the coupling lenses 20 pass. In the present embodiment, the aperture plate 30 is formed integrally with the frame F. The aperture plate 30 is positioned between the coupling lenses 20 and the condenser lens 40. Four of the aperture diaphragms 31 (aperture diaphragms 31Y, 31M, 31C, and 31K) are provided to correspond to the four semiconductor lasers 10 and the four coupling lenses 20.

The condenser lens 40 is configured to focus the light beams exiting the coupling lenses 20 onto mirror surfaces of the polygon mirror 51 in the sub scanning direction. The condenser lens 40 is positioned on the opposite side of the aperture plate 30 from the coupling lenses 20.

Figure 3:
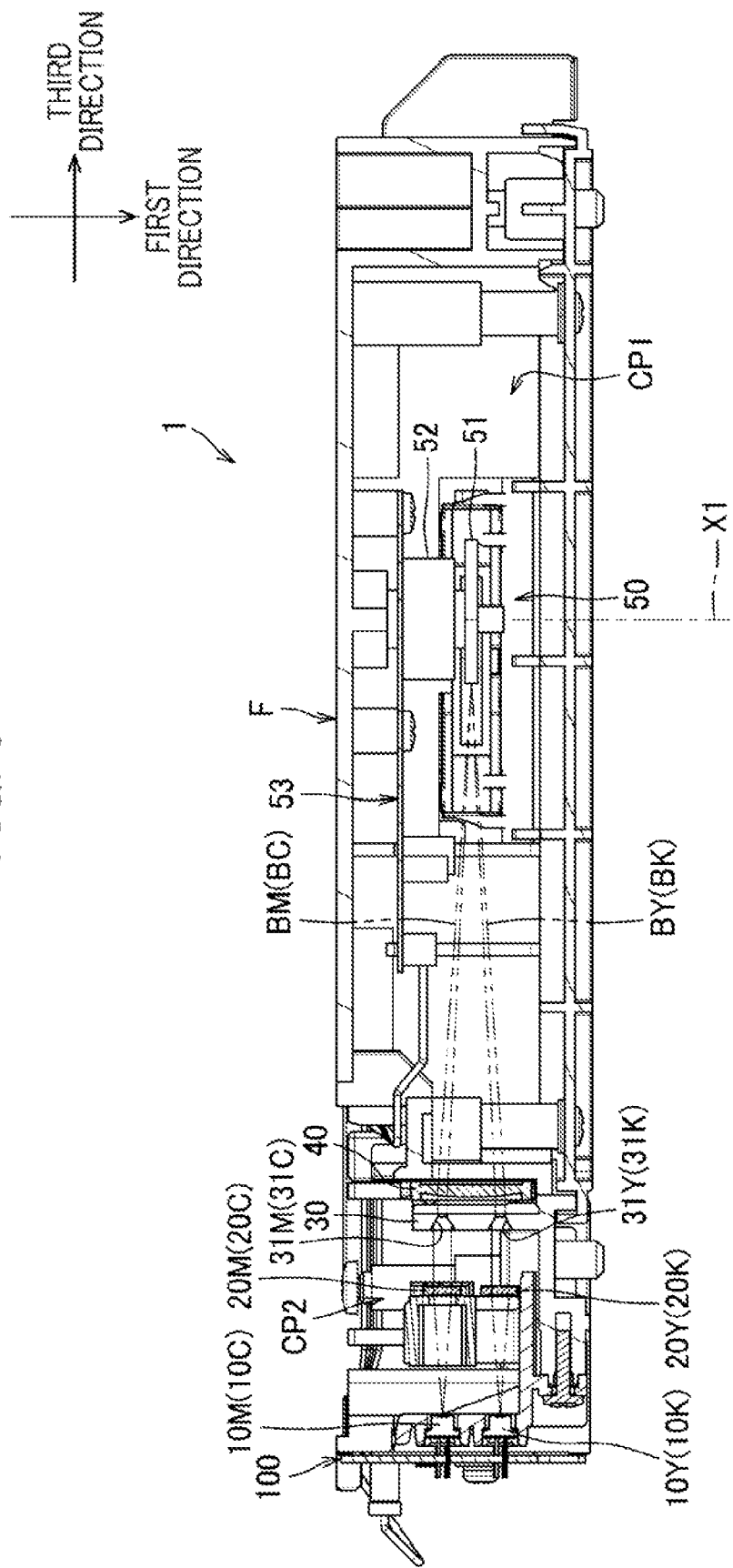
FIG. 3 is a cross-sectional view taken along line III-III in FIG. 1.

As illustrated in FIG. 3, the deflector 50 is a device configured to deflect the light beams exiting the coupling lenses 20 in the main scanning direction (the third direction). The deflector 50 includes the polygon mirror 51, a polygon motor 52, and a motor board 53. By rotating, the polygon mirror 51 deflects the first light beams BY and BM from the first coupling lenses 20Y and 20M and the second light beams BC and BK from the second coupling lenses 20C and 20K in the main scanning direction. That is, the polygon mirror 51 deflects the light beams from the coupling lenses 20 in the main scanning direction. The polygon mirror 51 has five mirror surfaces that are equidistant from the rotational axis X1 (see also FIG. 1). The polygon motor 52 is configured to drive the polygon mirror 51 to rotate. The polygon motor 52 is mounted on the motor board 53 which is fixed to the frame F. In other words, the deflector 50 is fixed to the frame F.

Figure 4:
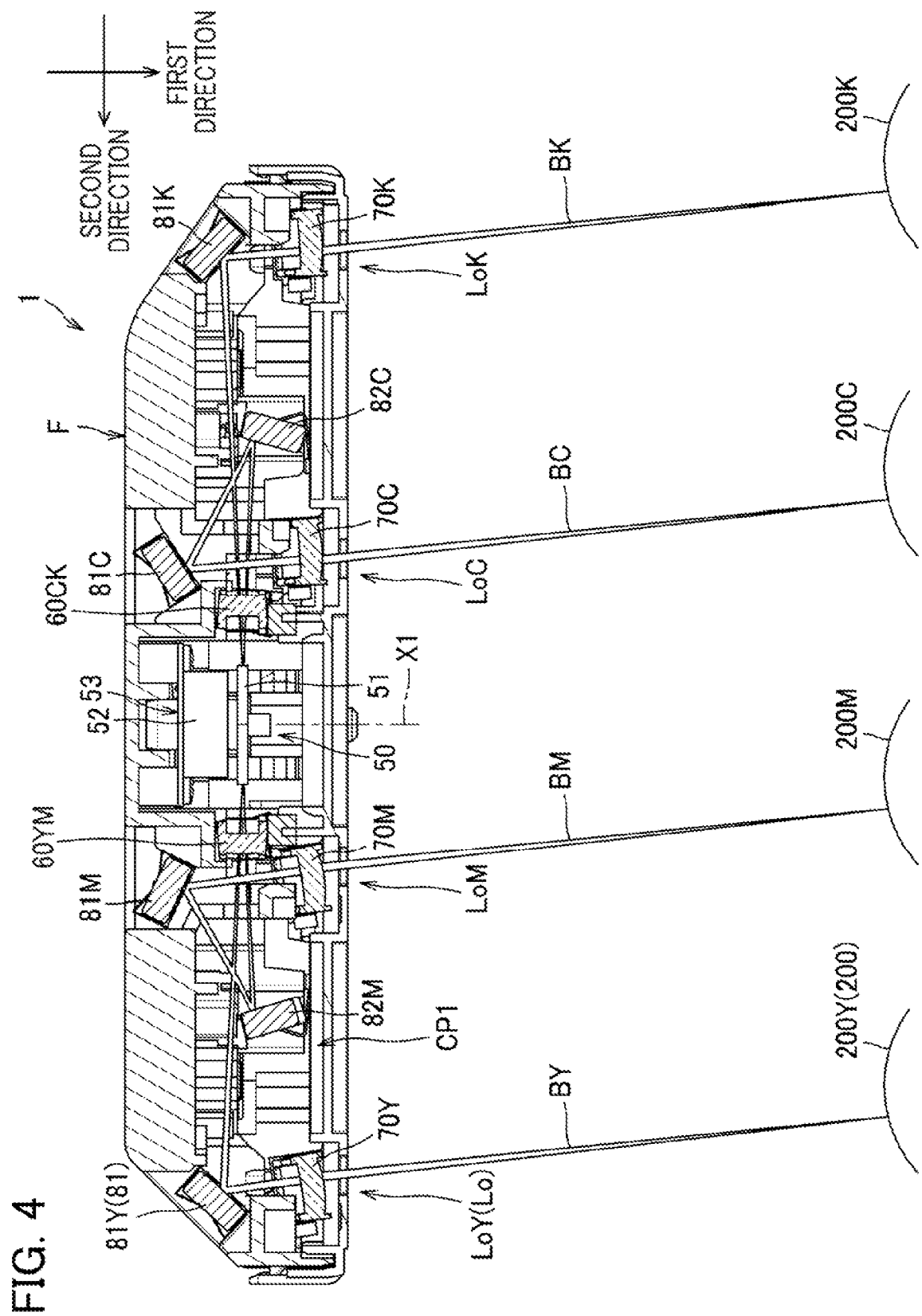
FIG. 4 is a cross-sectional view taken along line IV-IV in FIG. 1.

As illustrated in FIG. 4, the scanning optical systems Lo are configured to form images on surfaces of the corresponding photosensitive drums 200, as image planes, using the light beams deflected by the deflector 50. Components constituting each scanning optical system Lo are fixed to the frame F. The scanning optical systems Lo include first scanning optical systems LoY and LoM respectively corresponding to yellow and magenta, and second scanning optical systems LoC and LoK respectively corresponding to cyan and black. The first scanning optical systems LoY and LoM are configured to form images on corresponding image planes using the first light beams BY and BM. The second scanning optical systems LoC and LoK are configured to form images on corresponding image planes using the second light beams BC and BK.

The first scanning optical systems LoY and LoM are disposed on the one side of the polygon mirror 51 in the second direction. The second scanning optical systems LoC and LoK are disposed on the other side of the polygon mirror 51 in the second direction. In other words, the deflector 50 is positioned between the first scanning optical systems LoY and LoM and the second scanning optical systems LoC and LoK. The light beams deflected by the polygon mirror 51 are incident on the corresponding scanning optical systems LoY, LoM, LoC, and LoK. The scanning optical systems LoY, LoM, LoC, and LoK use the first light beams BY and BM and the second light beams BC and BK deflected by the deflector 50 to form images on the corresponding image planes.

The first scanning optical system LoY includes the first scanning lens 60YM, a second scanning lens 70Y, and a reflecting mirror 81Y. The first scanning lens 60YM is an optical component positioned closest to the deflector 50 among all optical components configuring the first scanning optical system LoY. Specifically, the first scanning lens 60YM is the optical component positioned closest to the deflector 50 when considering a distance along an optical path of the light beam BY passing through a center in the main scanning direction of the first scanning optical system LoY.

The first scanning lens 60YM is configured to refract the first light beams BY and BM deflected by the deflector 50 in the main scanning direction to form images on the corresponding photosensitive drums 200Y and 200M. The first scanning lens 60YM has fθ characteristics that make the first light beams BY and BM scanned at an equal angular velocity by the deflector 50 move at an equal velocity over the photosensitive drums 200Y and 200M.

The reflecting mirror 81Y is configured to reflect the first light beam BY exiting the first scanning lens 60YM toward the first photosensitive drum 200Y.

The second scanning lens 70Y is configured to refract the first light beam BY reflected by the reflecting mirror 81Y in the sub scanning direction to form an image on the photosensitive drum 200Y. In the scanning optical systems Lo, the sub scanning direction corresponds to a direction orthogonal to both the main scanning direction and a direction in which the light beam travels. The second scanning lens 70Y is positioned on the one side of the polygon mirror 51 in the first direction.

The first scanning optical system LoM includes the first scanning lens 60YM, a second scanning lens 70M, a reflecting mirror 81M, and a mirror 82M. The first scanning lens 60YM is an optical component positioned closest to the deflector 50 among all optical components configuring the first scanning optical system LoM.

The first scanning lens 60YM of the first scanning optical system LoM is shared with the first scanning optical system LoY. The mirror 82M is configured to reflect the first light beam BM exiting the first scanning lens 60YM onto the reflecting mirror 81M. The second scanning lens 70M and the reflecting mirror 81M have functions the same as those of the second scanning lens 70Y and the reflecting mirror 81Y in the first scanning optical system LoY. In other words, the reflecting mirror 81M is configured to reflect the first light beam BM reflected off the mirror 82M toward the photosensitive drum 200M, and the second scanning lens 70M is configured to refract the first light beam BM reflected by the reflecting mirror 81M in the sub scanning direction to form an image on the photosensitive drum 200M.

The second scanning optical system LoC has an approximately symmetrical configuration to the first scanning optical system LoM about the rotational axis X1 of the polygon mirror 51. Specifically, the second scanning optical system LoC includes the first scanning lens 60CK, a second scanning lens 70C, a reflecting mirror 81C, and a mirror 82C, which have the same functions as the components in the first scanning optical system LoM. The first scanning lens 60CK is an optical component positioned closest to the deflector 50 among all optical components configuring the second scanning optical system LoC.

The first scanning lens 60CK is configured to refract the second light beams BC and BK deflected by the deflector 50 in the main scanning direction to form images on the corresponding photosensitive drums 200C and 200K. The mirror 82C is configured to reflect the second light beam BC exiting the first scanning lens 60CK onto the reflecting mirror 81C, and the reflecting mirror 81C is configured to reflect the second light beam BC reflected off the mirror 82C toward the photosensitive drum 200C. The second scanning lens 70C is configured to refract the second light beam BC reflected by the reflecting mirror 81C in the sub scanning direction to form an image on the photosensitive drum 200C.

The second scanning optical system LoK has an approximately symmetrical configuration to the first scanning optical system LoY about the rotational axis X1 of the polygon mirror 51. Specifically, the second scanning optical system LoK includes the first scanning lens 60CK, a second scanning lens 70K, and a reflecting mirror 81K, which have the same functions as the components in the first scanning optical system LoY. The first scanning lens 60CK is an optical component positioned closest to the deflector 50 among all optical components configuring the second scanning optical sys1kitem LoK.

The reflecting mirror 81K is configured to reflect the second light beam BK exiting the first scanning lens 60CK toward the photosensitive drum 200K, and the second scanning lens 70K is configured to refract the second light beam BK reflected by the reflecting mirror 81K in the sub scanning direction to form an image on the photosensitive drum 200K.

As illustrated in FIG. 3, lights emitted from the semiconductor lasers 10Y, 10M, 10C, and 10K are respectively converted into the light beams BY, BM, BC, and BK by passing through the corresponding coupling lenses 20Y, 20M, 20C, and 20K. The light beams BY, BM, BC, and BK pass first through the corresponding aperture diaphragms 31Y, 31M, 31C, and 31K of the aperture plate 30, then through the condenser lens 40, and are incident on the polygon mirror 51. The condenser lens 40 is a shared lens through which the light beams BY, BM, BC, and BK pass. The condenser lens 40 has an incident surface which is a cylindrical surface, and an emitting surface which is a flat surface.

As illustrated in FIG. 4, the polygon mirror 51 deflects the light beams BY, BM, BC, and BK toward the corresponding scanning optical systems LoY, LoM, LoC, and LoK. The first light beam BY deflected toward the first scanning optical system LoY passes through the first scanning lens 60YM, is reflected by the reflecting mirror 81Y, and is emitted through the second scanning lens 70Y toward the first photosensitive drum 200Y on the one side in the first direction. The first light beam BY exits the second scanning lens 70Y at a predetermined angle relative to the first direction. The first light beam BY is scanned in the main scanning direction to form an image on the surface of the photosensitive drum 200Y.

The first light beam BM travels toward the first scanning optical system LoM passes through the first scanning lens 60YM, is reflected by the mirror 82M and the reflecting mirror 81M, and is emitted through the second scanning lens 70M toward the photosensitive drum 200M on the one side in the first direction. The first light beam BM exits the second scanning lens 70M at a predetermined angle relative to the first direction. The first light beam BM is scanned in the main scanning direction to form an image on the surface of the photosensitive drum 200M.

Similarly, the second light beams BC and BK are emitted by the corresponding second scanning optical systems LoC and LoK toward the corresponding photosensitive drums 200C and 200K on the one side in the first direction, and are scanned in the main scanning direction to form images on the surfaces of the corresponding photosensitive drums 200C and 200K.

The frame F is formed of resin and is integrally molded with molding. The frame F has a first recess CP1 (see FIG. 2), and a second recess CP2 (see FIG. 1). The first recess CP1 is open at the frame F on the one side in the first direction. The second recess CP2 is open at the frame F on the other side in the first direction. As illustrated in FIG. 4, the deflector 50 and a portion of the scanning optical systems Lo are disposed in the first recess CP1. Specifically, all components of the scanning optical systems Lo excluding the reflecting mirrors 81Y, 81M, 81C, and 81K are disposed in the first recess CP1. As illustrated in FIG. 1, the coupling lenses 20, the aperture plate 30, and the condenser lens 40 are disposed in the second recess CP2. The second recess CP2 is arranged on the other side of the first recess CP1 in the third direction.

The frame F includes a first base wall Fb1 positioned at a bottom of the first recess CP1, and a second base wall Fb2 positioned at a bottom of the second recess CP2.

The first base wall Fb1 and the second base wall Fb2 intersect the first direction. Specifically, the first base wall Fb1 and the second base wall Fb2 are walls whose thickness direction is parallel to the first direction. In other words, the first base wall Fb1 and the second base wall Fb2 have flat surfaces orthogonal to the first direction.

Figure 5:
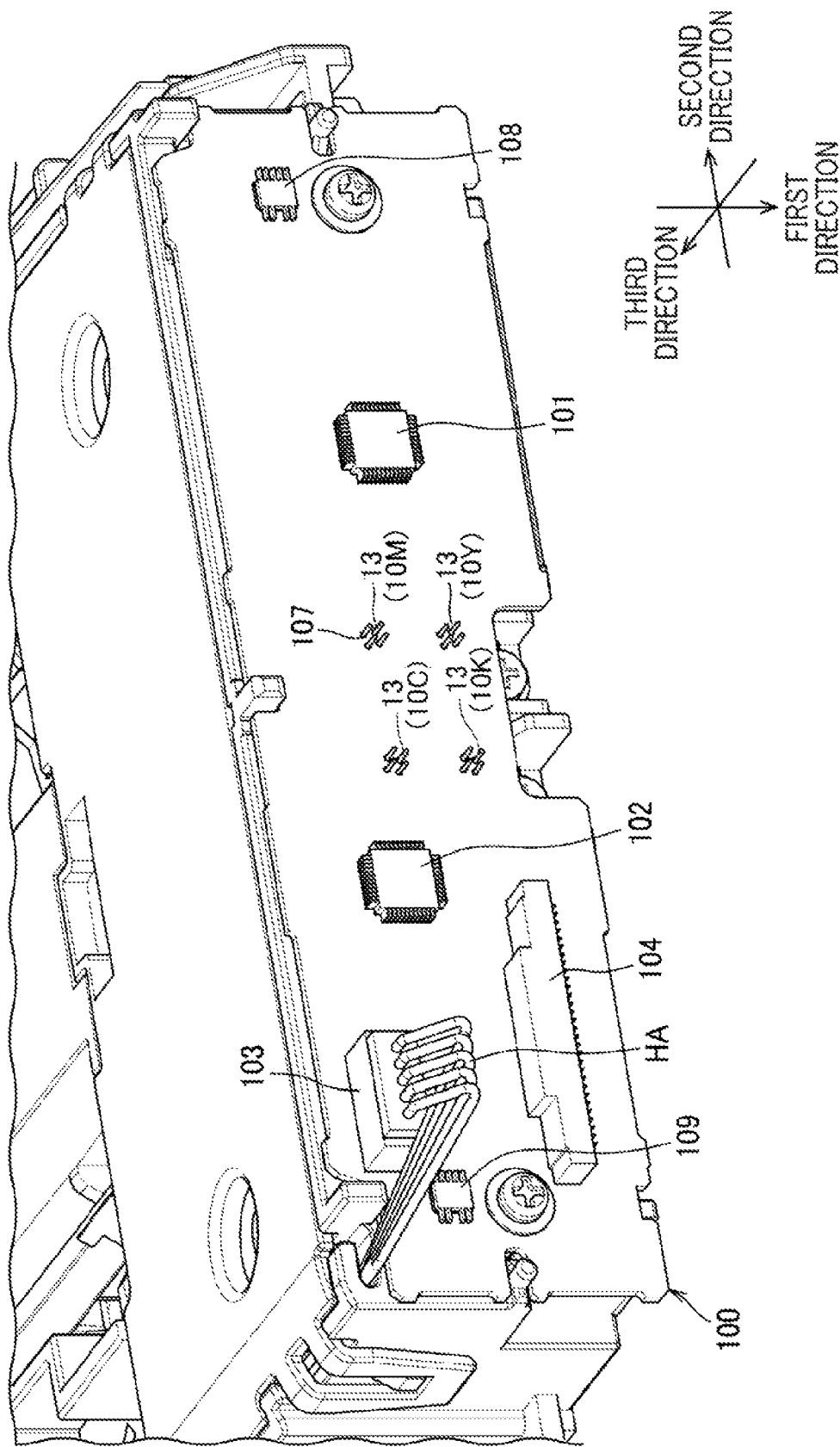
FIG. 5 is a perspective view of a circuit board as viewed from the other side in the first direction.
Figure 6:
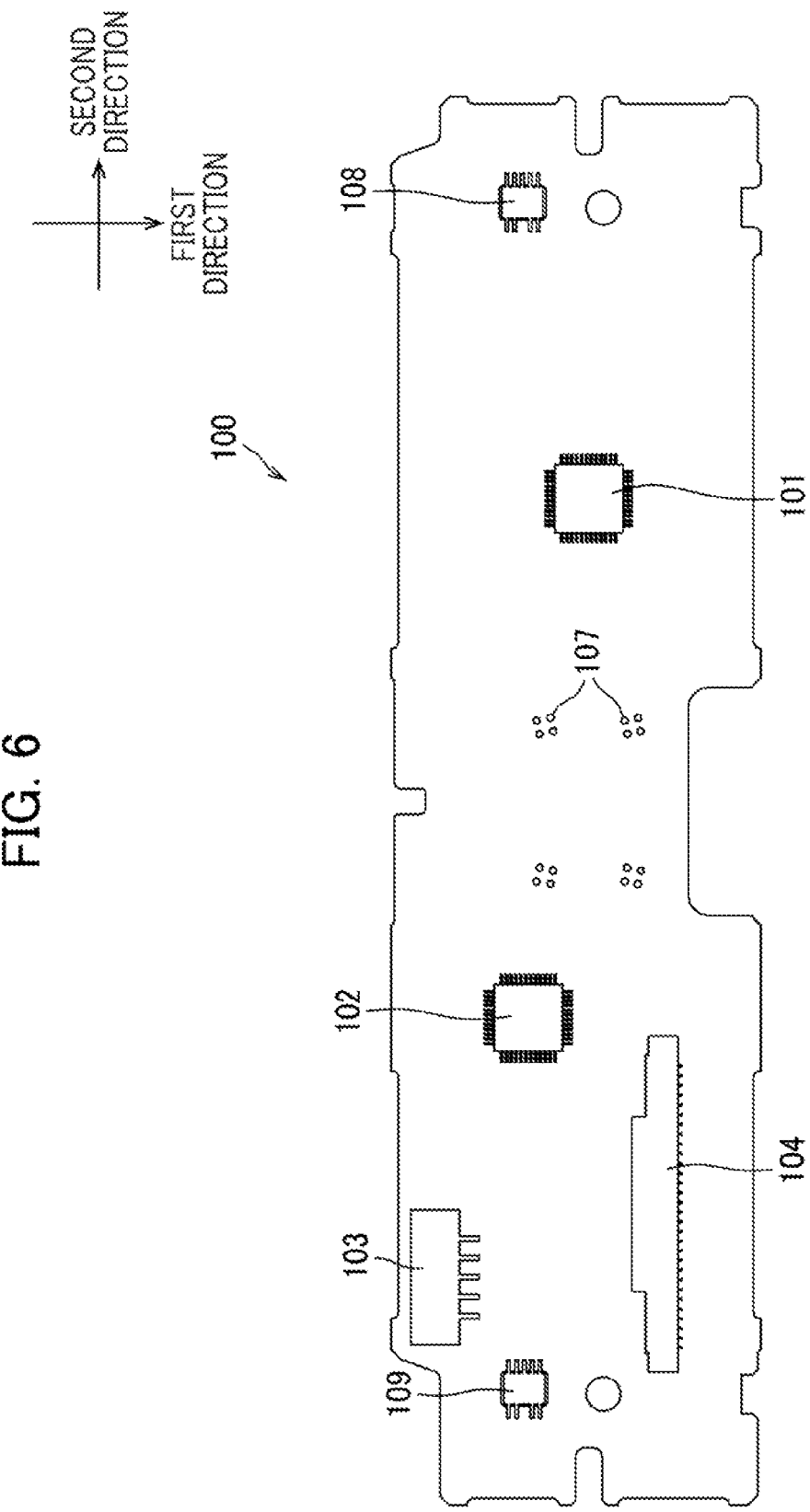
FIG. 6 is a front view of the circuit board as viewed from another side in a third direction.

As illustrated in FIGS. 5 and 6, the circuit board 100 is disposed at one end portion on the other side of the frame F in the third direction. The circuit board 100 has a rectangular shape whose long sides are parallel to the second direction.

The circuit board 100 includes a first laser driver 101, a second laser driver 102, a first connector 103, and a second connector 104, and has lead holes 107. The first optical sensor 108 and the second optical sensor 109 are arranged on the circuit board 100. In other words, the first semiconductor lasers 10Y and 10M, the second semiconductor lasers 10C and 10K, the first optical sensor 108, and the second optical sensor 109 are all mounted on the circuit board 100 in the present embodiment. The scanning optical device 1 further includes a first mirror 111, and a second mirror 112 (see FIG. 8).

The first semiconductor lasers 10Y and 10M, the second semiconductor lasers 10C and 10K, the first connector 103, the second connector 104, and the lead holes 107 are positioned between the first optical sensor 108 and the second optical sensor 109 on the circuit board 100 in the second direction. The first laser driver 101, the second laser driver 102, the first optical sensor 108, and the second optical sensor 109 are positioned between the first connector 103 and the second connector 104 on the circuit board 100 in the first direction.

The first laser driver 101 and the second laser driver 102 function to drive the semiconductor lasers 10. The first laser driver 101 is an integrated circuit (IC) configured to drive the first semiconductor lasers 10Y and 10M, and the second laser driver 102 is an integrated circuit (IC) configured to drive the second semiconductor lasers 10C and 10K.

The first connector 103 is disposed on a corner of the circuit board 100 at one end portion on the other side in the first direction and one end portion on the other side in the second direction. The scanning optical device 1 further includes a wiring harness HA that is connected to the first connector 103. Specifically, the wiring harness HA connects the first connector 103 of the circuit board 100 and the motor board 53 to each other. The wiring harness HA is wiring configured of five cables for transmitting signals from the circuit board 100 to the motor board 53. The wiring harness HA is, for example, a cable assembly.

The second connector 104 is an example of the connector that is connected to a wiring harness (not illustrated). The second connector 104 is disposed on a corner of the circuit board 100 at one end portion on the one side in the first direction and the one end portion of the other side in the second direction. The wiring harness extends from a main body of the image-forming apparatus. Through this connection, a controller of the image-forming apparatus can transmit signals for controlling the first semiconductor lasers 10Y and 10M and signals for controlling the second semiconductor lasers 10C and 10K. The wiring harness is, for example, a flexible flat cable.

The lead holes 107 are holes through which leads 13 of the semiconductor lasers 10 are inserted. The circuit board 100 has four lead holes 107 for each of the semiconductor lasers 10 to receive the four leads 13 possessed by each semiconductor laser 10. Thus, the circuit board 100 in the present embodiment has a total of sixteen lead holes 107 to correspond to the leads 13 of the four semiconductor lasers 10Y, 10M, 10C, and 10K.

The first optical sensor 108 is configured to detect the first light beam BY deflected by the deflector 50. That is, among the first light beams BY and BM, the first optical sensor 108 detects the first light beam BY corresponding to yellow. Specifically, the first optical sensor 108 is a sensor for determining a write timing for writing an image on the surfaces of the photosensitive drums 200Y, 200M, 200C, and 200K using the respective light beams BY, BM, BC, and BK on the basis of a detection signal indicating that the first light beam BY has been detected.

Figure 7:
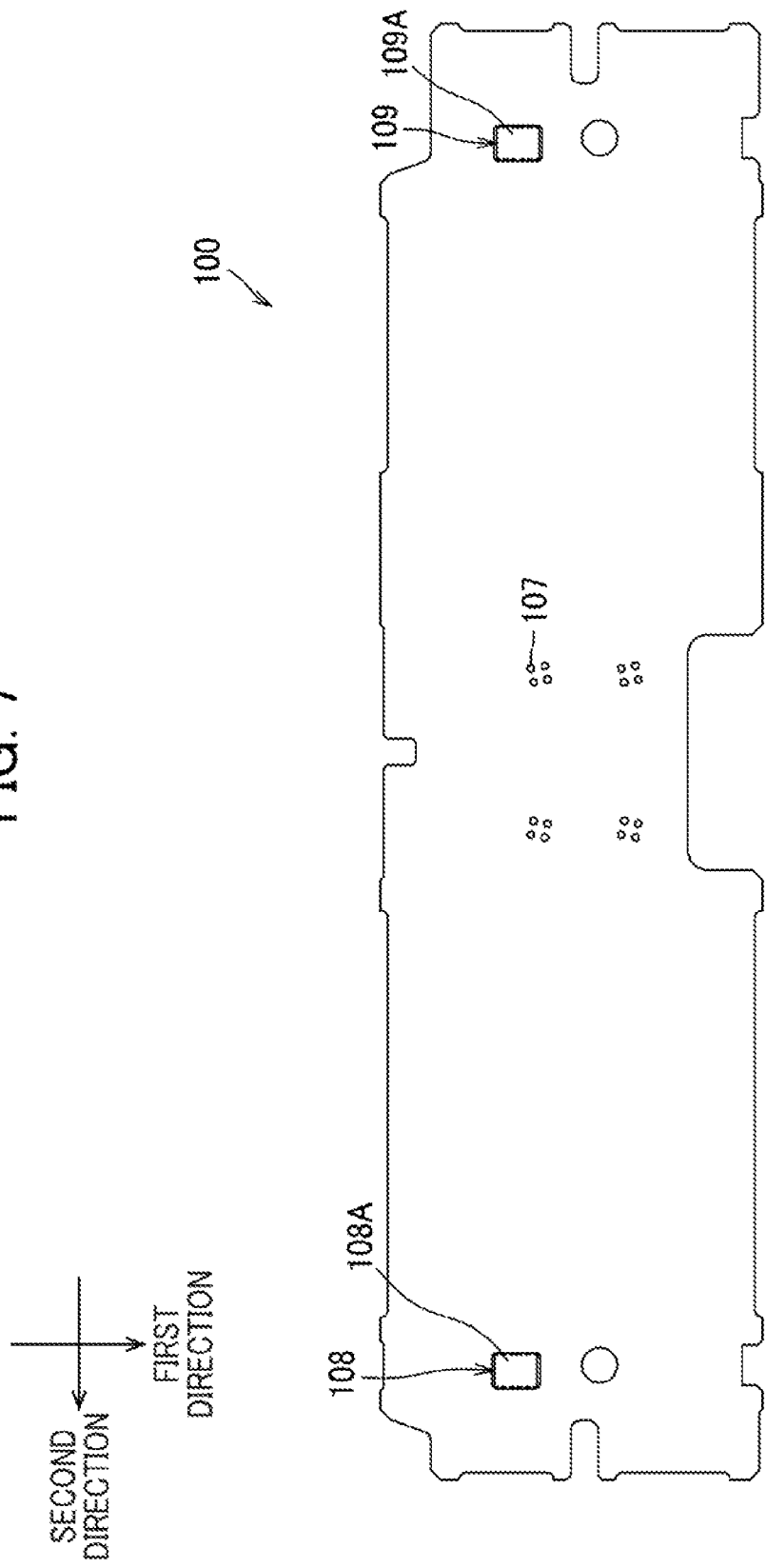
FIG. 7 is a rear view of the circuit board as viewed from one side in the third direction.
Figure 8:
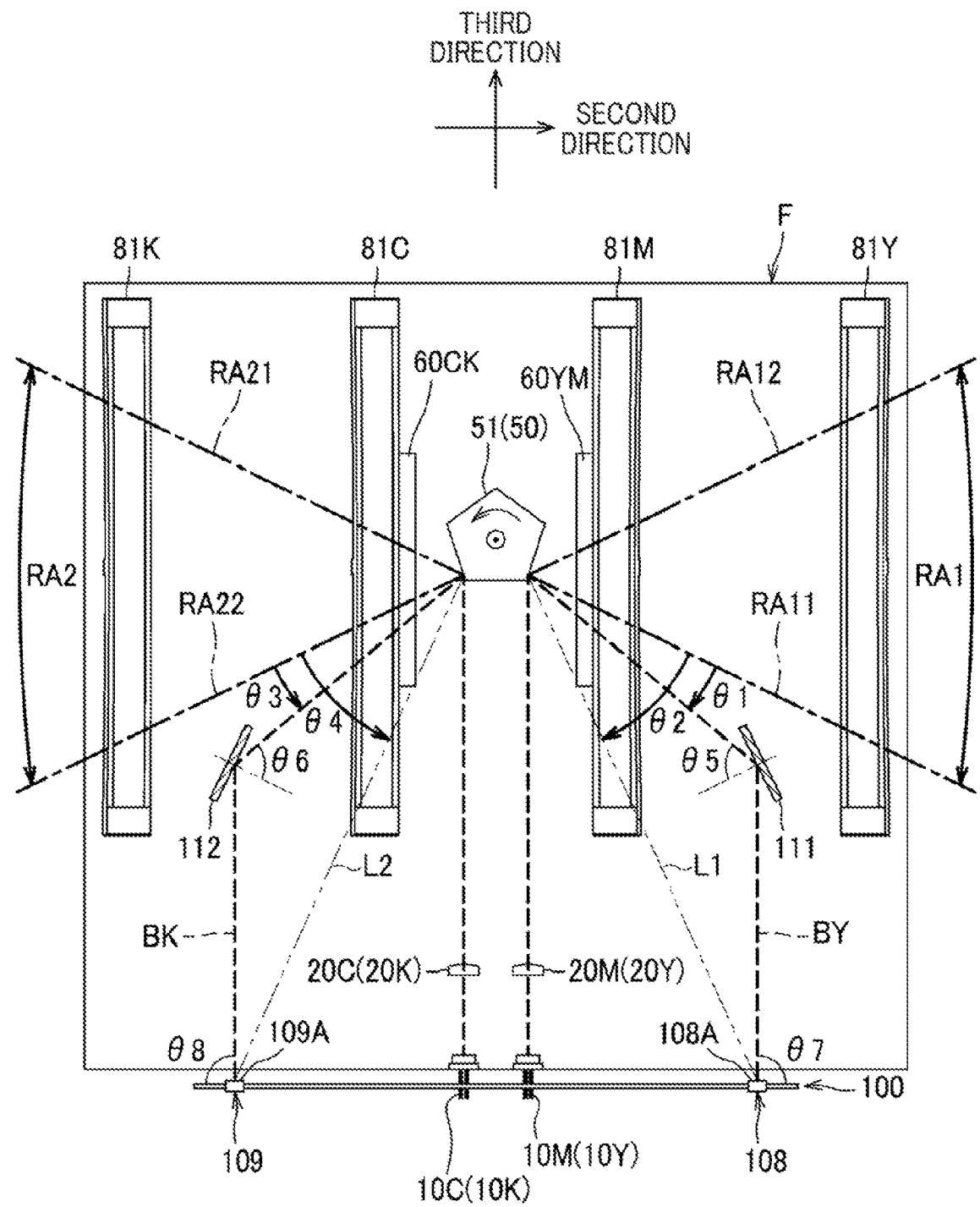
FIG. 8 is a top view of the scanning optical device and illustrates optical paths of light beams emitted from first and second semiconductor lasers to first and second optical sensors.

The first optical sensor 108 is disposed on one end portion of the circuit board 100 on the one side in the second direction. As illustrated in FIGS. 6 and 7, the first optical sensor 108 is embedded in the circuit board 100 and exposed on both sides of the circuit board 100 in the third direction. As illustrated in FIG. 8, the first optical sensor 108 has a detection surface 108A that faces the frame F. The detection surface 108A is configured to detect the first light beam BY emitted from the polygon mirror 51 and reflected by the first mirror 111.

The first mirror 111 is provided in the frame F for reflecting the first light beam BY defected by the deflector 50 to guide the first light beam BY toward the first optical sensor 108. The first mirror 111 is positioned between the polygon mirror 51 and the first optical sensor 108 in the third direction. When viewed in the third direction, the first mirror 111 is disposed at a position overlapped with the first optical sensor 108.

Here, a scanning range used for forming an image with the first light beam BY is indicated as a first effective scanning range RA1 in FIG. 8. The first effective scanning range RA1 is a range from an upstream end RA11 to a downstream end RA12. An optical path of the first light beam BY from the deflector 50 toward the first mirror 111 is displaced upstream from the upstream end RA11 of the first effective scanning range RA1 in a rotational direction of the polygon mirror 51 by a first angle θ1. The first angle θ1 is an angle viewed in the first direction. The following description will assume that all angles are similarly viewed in the first direction.

Here, when an angle formed by the upstream end RA11 of the first effective scanning range RA1 and a straight line L1 passing through the first optical sensor 108 and a point on the polygon mirror 51 at which the first light beam BY is reflected (indicated by a two-dot chain line in FIG. 8) is defined as a second angle θ2, the first angle θ1 is smaller than the second angle θ2. In the present embodiment, the first angle θ1 is no greater than half the second angle θ2.

The first light beam BY deflected by the deflector 50 toward the first mirror 111 is reflected by the first mirror 111 to reach the first optical sensor 108 so as to form an angle greater than or equal to 90 degrees between the first light beam BY incident on the first mirror 111 and the first light beam BY emitted from the first mirror 111. That is, an incident angle θ5 on the first mirror 111 is greater than 45 degrees.

Here, the polygon mirror 51 rotates counterclockwise when viewed from the other side in the first direction (the rotational direction is indicated by an arrow in FIG. 8). The first optical sensor 108 can detect the first light beam BY on the upstream side of the first effective scanning range RA1 for the first scanning optical system LoY in a direction in which the first light beam BY is scanned in the first scanning optical system LoY.

The second optical sensor 109 is configured to detect the second light beam BK deflected by the deflector 50. That is, among the second light beams BC and BK, the second optical sensor 109 detects the second light beam BK corresponding to black. Specifically, the second optical sensor 109 is a sensor for detecting a timing after which writing of an image using the second light beam BK on the photosensitive drum 200K is completed.

The second optical sensor 109 is disposed on the one end portion of the circuit board 100 on the other side in the second direction. As illustrated in FIGS. 6 and 7, the second optical sensor 109 is embedded in the circuit board 100 and exposed on both sides of the circuit board 100 in the third direction. As illustrated in FIG. 8, the second optical sensor 109 has a detection surface 109A that faces the frame F. The detection surface 109A is configured to detect the second light beam BK emitted from the polygon mirror 51 and reflected by the second mirror 112.

The second mirror 112 is provided in the frame F for reflecting the second light beam BK deflected by the deflector 50 to guide the second light beam BK toward the second optical sensor 109. The second mirror 112 is positioned between the polygon mirror 51 and the second optical sensor 109 in the third direction. When viewed in the third direction, the second mirror 112 is disposed at a position overlapped with the second optical sensor 109.

Here, a scanning range used for forming an image with the second light beam BK is indicated as a second effective scanning range RA2 in FIG. 8. The second effective scanning range RA2 is a range from an upstream end RA21 to a downstream end RA22. An optical path of the second light beam BK from the deflector 50 toward the second mirror 112 is displaced downstream from the downstream end RA22 of the second effective scanning range RA2 in the rotational direction of the polygon mirror 51 by a third angle θ3.

Here, when an angle formed by the downstream end RA22 of the second effective scanning range RA2 and a straight line L2 passing through the second optical sensor 109 and a point on the polygon mirror 51 at which the second light beam BK is reflected (indicated by a two-dot chain line in FIG. 8) is defined as a fourth angle θ4, the third angle θ3 is smaller than the fourth angle θ4. In the present embodiment, the third angle θ3 is no greater than half the fourth angle θ4. The third angle θ3 in the present embodiment is equivalent to the first angle θ1.

The second light beam BK deflected by the deflector 50 toward the second mirror 112 is reflected to reach the second optical sensor 109 by the second mirror 112 so as to form an angle greater than or equal to 90 degrees between the second light beam BK incident on the second mirror 112 and the second light beam BK emitted from the second mirror 112. That is, an incident angle θ6 on the second mirror 112 is greater than 45 degrees.

The second optical sensor 109 can detect the second light beam BK on the downstream side of the second effective scanning range RA2 for the second scanning optical system LoK in a direction in which the second light beam BK is scanned in the second scanning optical system LoK.

A seventh angle θ7 formed by the first light beam BY and the detection surface 108A of the first optical sensor 108 is equivalent to an eighth angle θ8 formed by the second light beam BK and the detection surface 109A of the second optical sensor 109. Specifically, the seventh angle θ7 between the detection surface 108A and the first light beam BY incident on the detection surface 108A is equivalent to the eighth angle θ8 between the detection surface 109A and the second light beam BK incident on the detection surface 109A. In the present embodiment, both the seventh angle θ7 and the eighth angle θ8 are 90 degrees.

The embodiment described above can obtain the following advantages. The scanning optical device 1 in the above embodiment includes the first semiconductor lasers 10Y and 10M, the second semiconductor lasers 10C and 10K, the first optical sensor 108, and the second optical sensor 109. The first semiconductor lasers 10Y and 10M, the second semiconductor lasers 10C and 10K, the first optical sensor 108, and the second optical sensor 109 are all mounted on the circuit board 100.

Therefore, when assembling the scanning optical device 1, the circuit board 100 on which the first semiconductor lasers 10Y and 10M, the second semiconductor lasers 10C and 10K, the first optical sensor 108, and the second optical sensor 109 are mounted just need be fixed to the frame F. Accordingly, assembly of the scanning optical device 1 is easier than a case where each of the first semiconductor lasers 10Y and 10M, the second semiconductor lasers 10C and 10K, the first optical sensor 108, and the second optical sensor 109 must be fixed to the frame F individually.

Since the deflector 50 is positioned between the first scanning optical systems LoY and LoM and the second scanning optical systems LoC and LoK, the single circuit board 100 can detect the light beams corresponding to the different scanning optical systems arranged on opposite sides of the deflector 50.

Further, since the first semiconductor lasers 10Y and 10M and the second semiconductor lasers 10C and 10K are positioned between the first optical sensor 108 and the second optical sensor 109 on the circuit board 100, an increased complexity in the optical paths of the light beams BY and BK leading to the first optical sensor 108 and the second optical sensor 109 can be avoided.

Further, by providing the first optical sensor 108 to detect the first light beam BY and the second optical sensor 109 to detect the second light beam BK, thermal expansion of the scanning optical device 1 can be calculated on the basis of the detection timings of the first optical sensor 108 and the second optical sensor 109.

Further, the incident angle for the light beams on the first mirror 111 and the second mirror 112 is greater than 45 degrees so that light beams near the first effective scanning range RA1 and the second effective scanning range RA2, i.e., the scanning range of light beams for exposing the photosensitive drums 200, can be guided to the corresponding first optical sensor 108 and second optical sensor 109 on the circuit board 100. In a case where the first mirror 111 and the second mirror 112 are not provided on the circuit board 100, the light beams need to be guided directly to the first optical sensor 108 and the second optical sensor 109 from the polygon mirror 51 (see the two-dot chain lines in FIG. 8). In such a case, the light beams would be farther from the first effective scanning range RA1 and the second effective scanning range RA2, resulting in larger detection errors than in the present embodiment.

Since the seventh angle θ7 formed by the first light beam BY and the detection surface 108A of the first optical sensor 108 is equivalent to the eighth angle θ8 formed by the second light beam BK and the detection surface 109A of the second optical sensor 109, the detection conditions for the first light beam BY and the second light beam BK can be made equal.

Further, by using the first mirror 111 and the second mirror 112 in the present embodiment, both the seventh angle θ7 formed by the first light beam BY and the detection surface 108A of the first optical sensor 108 and the eighth angle θ8 formed by the second light beam BK and the detection surface 109A of the second optical sensor 109 can be set to 90 degrees. Therefore, the position at which each beam is incident on the corresponding detection surfaces 108A and 109A is less likely to deviate, thereby further suppressing the detection errors by the first optical sensor 108 and the second optical sensor 109.

Since the circuit board 100 includes the second connector 104 which is connected to the wiring harness, the cables through which signals for controlling the first semiconductor lasers 10Y and 10M and signals for controlling the second semiconductor lasers 10C and 10K are transmitted can be combined into one cable.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Although the condenser lens 40 and the coupling lenses 20 are separate members in the above embodiment, the condenser lens may be integrally formed with the coupling lenses.

In the above embodiment, both the incident angle $\theta 5$ on the first mirror 111 and the incident angle $\theta 6$ on the second mirror 112 are greater than 45 degrees, but just one of the incident angle $\theta 5$ and the incident angle $\theta 6$ may be set greater than 45 degrees.

The third angle $\theta 3$ is equivalent to the first angle $\theta 1$ in the above embodiment, but the third angle $\theta 3$ and the first angle $\theta 1$ may be angles different from each other.

The seventh angle $\theta 7$ is equivalent to the eighth angle $\theta 8$ in the above embodiment, but the seventh angle $\theta 7$ and the eighth angle $\theta 8$ may be angles different from each other. Further, the seventh angle $\theta 7$ and the eighth angle $\theta 8$ need not be 90 degrees.

The elements described in the above embodiment and modifications may be implemented in any suitable combination.

What is claimed is:

1. A scanning optical device comprising:
a first semiconductor laser configured to emit first light;
a second semiconductor laser configured to emit second light;
a first coupling lens configured to convert the first light emitted from the first semiconductor laser into a first light beam;
a second coupling lens configured to convert the second light emitted from the second semiconductor laser into a second light beam;
a deflector comprising a polygon mirror configured to deflect the first light beam from the first coupling lens and the second light beam from the second coupling lens in a main scanning direction;
a first optical sensor configured to detect the first light beam deflected by the deflector;
a second optical sensor configured to detect the second light beam deflected by the deflector;
a first scanning optical system configured to form an image on a first image plane using the first light beam deflected by the deflector;
a second scanning optical system configured to form an image on a second image plane using the second light beam deflected by the deflector; and
a circuit board configured to drive the first semiconductor laser and the second semiconductor laser,
wherein the first semiconductor laser, the second semiconductor laser, the first optical sensor, and the second optical sensor are mounted on the circuit board,
wherein the first optical sensor has a first detection surface, and the second optical sensor has a second detection surface,
wherein the first detection surface and the second detection surface face in a direction the same as each other, and
wherein the first semiconductor laser and the second semiconductor laser are positioned between the first optical sensor and the second optical sensor on the circuit board.

2. The scanning optical device according to claim 1, wherein the circuit board comprises:
a first laser driver configured to drive the first semiconductor laser; and
a second laser driver configured to drive the second semiconductor laser.

3. The scanning optical device according to claim 1, wherein the deflector is positioned between the first scanning optical system and the second scanning optical system.

4. The scanning optical device according to claim 1, wherein the first optical sensor is configured to detect the first light beam on an upstream side of an effective scanning range of the first scanning optical system in a first scanning direction in which the first light beam is scanned in the first scanning optical system, and
wherein the second optical sensor is configured to detect the second light beam on a downstream side of an effective scanning range of the second scanning optical system in a second scanning direction in which the second light beam is scanned in the second scanning optical system.

5. The scanning optical device according to claim 1, further comprising:
a first mirror configured to reflect the first light beam deflected by the deflector to guide the first light beam toward the first optical sensor; and
a second mirror configured to reflect the second light beam deflected by the deflector to guide the second light beam toward the second optical sensor,
wherein at least one of an incident angle on the first mirror and an incident angle on the second mirror is greater than 45 degrees.

6. The scanning optical device according to claim 1, wherein an angle formed by the first light beam and the first detection surface is equivalent to an angle formed by the second light beam and the second detection surface.

7. The scanning optical device according to claim 1, wherein the circuit board further comprises a connector connected to a wiring harness through which a signal for controlling the first semiconductor laser and a signal for controlling the second semiconductor laser are transmitted.

8. The scanning optical device according to claim 1, wherein the deflector further comprises:
a polygon motor configured to drive the polygon mirror to rotate; and
a motor board on which the polygon motor is mounted, the scanning optical device further comprising a wiring harness connecting the circuit board and the motor board to each other.

9. The scanning optical device according to claim 1, wherein the first optical sensor is a sensor for determining a write timing for writing an image on the first image plane and the second image plane using the first light beam and the second light beam on the basis of a detection signal indicating that the first light beam has been detected.

10. The scanning optical device according to claim 1, wherein the second optical sensor is a sensor for detecting a timing after which writing of an image using the second light beam on the second image plane is completed.

11. The scanning optical device according to claim 1, further comprising a frame accommodating therein the deflector, the first scanning optical system, and the second scanning optical system,
wherein the polygon mirror is rotatable about a rotational axis extending in an axial direction, and wherein the circuit board is positioned at one end portion of the frame in a direction orthogonal to the axial direction and positioned outside the frame.

12. The scanning optical device according to claim 11, wherein both the first detection surface and the second detection surface face the frame.

13. The scanning optical device according to claim 1, wherein both the first optical sensor and the second optical sensor are exposed on both surfaces of the circuit board.

14. The scanning optical device according to claim 1, further comprising:
   a third semiconductor laser configured to emit third light;
   a fourth semiconductor laser configured to emit fourth light;
   a third coupling lens configured to convert the third light emitted from the third semiconductor laser into a third light beam; and
   a fourth coupling lens configured to convert the fourth light emitted from the fourth semiconductor laser into a fourth light beam,
   wherein the polygon mirror is further configured to deflect the third light beam from the third coupling lens and the fourth light beam from the fourth coupling lens in the main scanning direction.

15. The scanning optical device according to claim 1, wherein a distance between the first semiconductor laser and the second semiconductor laser is smaller than a distance between the first semiconductor laser and the first optical sensor.

16. The scanning optical device according to claim 2, wherein the first laser driver is an integrated circuit configured to drive the first semiconductor laser,
   wherein the second laser driver is an integrated circuit configured to drive the second semiconductor laser,
   wherein the first laser driver is positioned between the first semiconductor laser and the first optical sensor on the circuit board, and
   wherein the second laser driver is positioned between the second semiconductor laser and the second optical sensor on the circuit board.

* * * * *